United States Patent
Osikowicz

(10) Patent No.: US 9,468,990 B2
(45) Date of Patent: Oct. 18, 2016

(54) FRICTION STIR WELDING TOOL WITH SHOULDERS HAVING DIFFERENT AREAS; METHODS USING SUCH TOOL; PRODUCT WELDED WITH SUCH TOOL

(75) Inventor: Wojciech Osikowicz, Linköping (SE)

(73) Assignee: SAPA AB, Stockholm (SE)

( * ) Notice: Subject to any disclaimer, the term of this patent is extended or adjusted under 35 U.S.C. 154(b) by 448 days.

(21) Appl. No.: 14/128,472

(22) PCT Filed: Jun. 19, 2012

(86) PCT No.: PCT/EP2012/061673
§ 371 (c)(1),
(2), (4) Date: Dec. 20, 2013

(87) PCT Pub. No.: WO2013/007481
PCT Pub. Date: Jan. 17, 2013

(65) Prior Publication Data
US 2014/0119814 A1     May 1, 2014

Related U.S. Application Data

(60) Provisional application No. 61/499,833, filed on Jun. 22, 2011.

(51) Int. Cl.
| | | |
|---|---|---|
| B32B 37/00 | (2006.01) | |
| B23K 20/12 | (2006.01) | |
| B29C 65/06 | (2006.01) | |

(52) U.S. Cl.
CPC ......... B23K 20/1255 (2013.01); B23K 20/126 (2013.01); B23K 20/1225 (2013.01);
(Continued)

(58) Field of Classification Search
CPC ............ B32K 20/122; B23K 20/1225; B23K 20/1255; B23K 20/126; B29C 65/06; B29C 65/0672
USPC ................ 156/73.1, 580.1; 228/2.1, 112.1
See application file for complete search history.

(56) References Cited

U.S. PATENT DOCUMENTS

| | | | | |
|---|---|---|---|---|
| 6,193,137 B1 * | 2/2001 | Ezumi | ............... | B23K 20/122 228/112.1 |
| 6,199,745 B1 | 3/2001 | Campbell et al. | | |

(Continued)

FOREIGN PATENT DOCUMENTS

| | | |
|---|---|---|
| DE | 100 31 689 A1 | 1/2002 |
| JP | 2002-263863 A | 9/2002 |

(Continued)

OTHER PUBLICATIONS

International Search Report and Written Opinion in PCT International Application No. PCT/EP2012/061673, dated Nov. 6, 2012.

(Continued)

*Primary Examiner* — James Sells
(74) *Attorney, Agent, or Firm* — Venable LLP; Steven J. Schwarz

(57) ABSTRACT

The present application relates to a friction stir welding tool (20) for joining two adjacent work pieces (10), which work pieces comprise portions (6) to be welded and having a narrow space there between on one side, said tool having an axis of rotation, and comprising a first shoulder (1), a second shoulder (2), and a pin (3) arranged so as to connect the first and second shoulders, wherein said first shoulder has a first contact surface for friction heat generation to the work pieces to be joined during welding, said first contact surface having a first contact area, and said second shoulder has a second contact surface for friction heat generation to an opposite surface (5) of the same portions of the work pieces to be joined, said second contact surface having a second contact area, the first and second areas having different sizes, where the first area is a larger sized area than the second area. The application also relates to a method of joining work pieces, a product comprising joined pieces, and the use of such friction stir welding tool.

24 Claims, 5 Drawing Sheets

(52) U.S. Cl.
CPC ..... *B29C65/0672* (2013.01); *B23K 2201/006* (2013.01); *B23K 2201/045* (2013.01); *B23K 2201/18* (2013.01); *B23K 2203/10* (2013.01); *Y10T 403/477* (2015.01)

(56) References Cited

U.S. PATENT DOCUMENTS

| | | | | |
|---|---|---|---|---|
| 6,532,712 | B2* | 3/2003 | Kawasaki | B23K 20/122 52/223.12 |
| 7,121,450 | B2* | 10/2006 | Ezumi | B23K 20/122 228/112.1 |
| 7,665,651 | B2 | 2/2010 | Aota et al. | |
| 8,100,311 | B2* | 1/2012 | Ostersehlte | B23K 20/123 228/112.1 |
| 2002/0119336 | A1* | 8/2002 | Kawasaki | B23K 20/122 428/544 |

FOREIGN PATENT DOCUMENTS

| | | |
|---|---|---|
| JP | 2003-290936 A | 10/2003 |
| JP | 2004-216435 A | 8/2004 |
| JP | 2004-243375 A | 9/2004 |
| JP | 2007-253210 A | 10/2007 |
| JP | 2007-307579 A | 11/2007 |

OTHER PUBLICATIONS

International Preliminary Report on Patentability in PCT International Application No. PCT/EP2012/061673, dated Sep. 30, 2013.

* cited by examiner

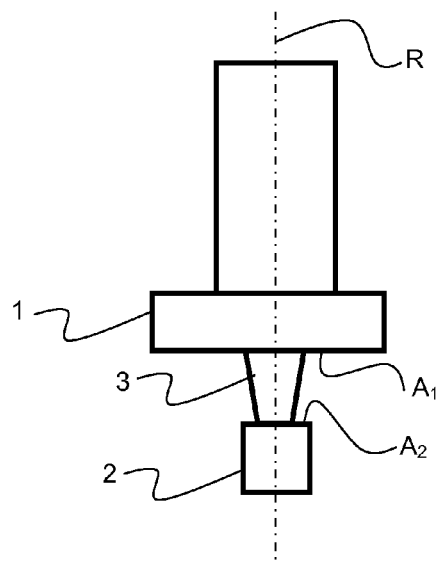
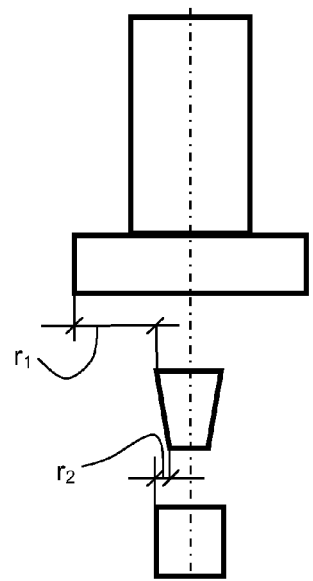
Fig. 3a
Fig. 3b
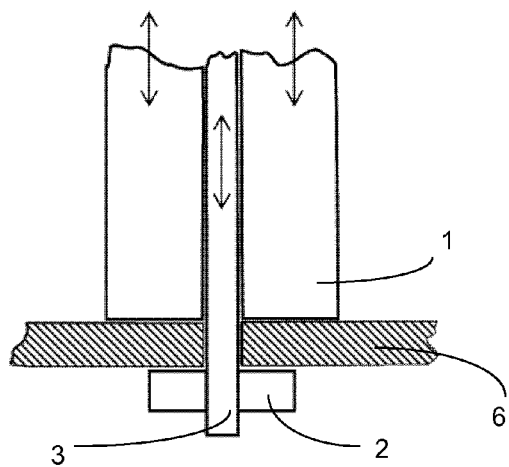
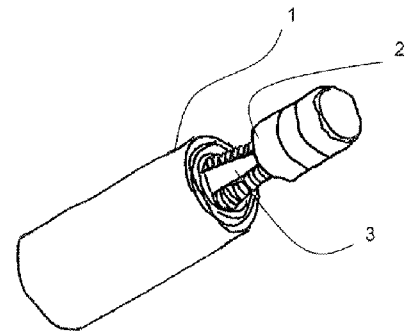
Fig. 4
Fig. 5

FRICTION STIR WELDING TOOL WITH SHOULDERS HAVING DIFFERENT AREAS; METHODS USING SUCH TOOL; PRODUCT WELDED WITH SUCH TOOL

CROSS REFERENCE TO RELATED APPLICATIONS

This application is a U.S. National Stage of International Application No. PCT/EP2012/061673, filed Jun. 19, 2012, which claims priority to U.S. Provisional Application No. 61/499,833, filed Jun. 22, 2011, and International Application No. PCT/EP2011/060471, filed Jun. 22, 2011, the disclosures of which are hereby incorporated herein by reference in their entirety.

TECHNICAL FIELD

The present invention pertains to a friction stir welding tool, a method of joining work pieces, particularly having a complicated geometry, to a product comprising joined pieces, and the use of friction stir welding tool with improved access ability in narrow spaces and higher productivity.

BACKGROUND OF THE INVENTION

It is known in the art to use a friction stir welding (FSW) for joining of two metal or plastic work pieces. In essence, FSW employs a non-consumable rotating tool, which interacts with the work pieces by its contacting surfaces to generate frictional heating and thus plasticizes the material in a weld zone. Local softening of the material in the weld zone facilitates mixing of material from the work pieces and upon translation of the tool along the welding direction the joint is formed. The plasticized material tends to run-off from the weld zone under process loads, which in turn might lead to formation of internal or surface breaking defects in the joint. This is circumvented by confining softened material in the weld zone with aid of the work pieces material surrounding the weld zone, the tool shoulder(s) having contact surfaces interacting with the work pieces and an appropriate support, such as backing bar, if required to hold the plasticized material in the weld zone.

For instance, JP 2007-253210, FIGS. 1-9 illustrates friction stir welding of flat metal pieces, where the confinement of the softened material is achieved by the use of two shoulders interconnected by a pin. In case of other configurations of the work pieces than flat ones, e.g. with a limited access and space for the support from the bottom of the weld zone between the inclined inner triangular walls as illustrated here, the known conventional FSW tools are not applicable. In such instances fusion welding techniques are often called upon which produce joints with inferior quality and are more generally less productive especially for thicker section welding. An alternative as illustrated in FIG. 9 of JP2007-253210 provides the opportunity to use conventional symmetrical, balanced FSW tool having the equal-sized shoulders. However a symmetrical triangular shape of the profile providing the best load force distribution through the welded panel is then not achievable.

The perfect triangulation design of the aluminum panel allows for superior structural integrity and best utilization of the structural material used. Resulting stresses from applied bending moments and forces are evenly distributed, meaning that the material is fully utilized, partly due to the fact that the forces lines of action meet within the material. Generally, triangle-shaped profile cavities dramatically increase the shear resistance compared to rectangular-shaped cavities, since no parallel sides exist in a triangle. The fixed length of the sides structural stability of a triangle assures no change of the shape upon loading, which for instance is utilized in truss structures in structural engineering. Conversely as in frame structures, a rectangular shape requires both the lengths and the angles to be fixed in order to retain its shape upon loading.

For example, this problem appears in manufacturing of so called double skin panels from multi-void hollow extrusions or profiles made of aluminum alloy material by joining extrusions with FSW method into the double skin panels, having beneficial strength-to-weight ratio. These panels might be used in building constructions such as bridges or the similar, or in a mass transportation applications such as marine, rail stock and automotive applications requiring strong lightweight constructions being resistant to corrosion. Such multi-void hollow profiles extruded from aluminum alloys usually comprise a first flat portion called plate or skin, a second flat second portion called plate or skin, and interconnecting inner perpendicular or inclined walls or trusses arranged between the first and second flat portions forming a generally triangular shape in a cross section perpendicular to the extrusion direction as shown in e.g. U.S. Pat. No. 7,665,651.

U.S. Pat. No. 7,665,651 B2 relates to butt joining of two multi-void hollow extrusions into a double skin panel by FSW. Each double skin panel comprises an upper plate and a lower plate. In order to make FSW possible, a vertical plate member is arranged between the upper and lower plates to provide support in location where the friction stir welding is performed.

The inclined inner walls of double skin panels are carrying and distributing the load through the profile providing the strength for the entire panel. The inner inclined walls of the profiles ideally form regular or symmetrical triangular shape hollows in a cross section perpendicular to the extrusion direction. The more uniform and regular the triangular shape of the profile cross sections is, the better and higher is the strength of welded final panel due to the load distribution during use of such profile. The load distribution lines through the neighboring inclined inner walls shall preferably intersect each other within the flat portions called plates or skins, i.e. within the profile or the final panel material or the panel body, in order to avoid or minimize a bending moment upon loading. Such design reduces the risk of excessive bending moments acting on panels in service and thus strengthens the entire construction.

The need of the support to the welding area from the downwards side during FSW as described above might be solved in different ways by a separate support placed under the welded area (backing bar), or alternatively as illustrated in U.S. Pat. No. 7,665,651 it might be formed by work piece extensions underneath (integral backer). This solution has the disadvantage of forming crack-like notches in the vicinity of the weld which adversely affects fatigue performance of the construction. Besides that, moisture can accumulate in the crack between the faying surfaces and lead to accelerated corrosion in the welded section, and thus weaker construction. Furthermore, such profile construction does not provide the regular symmetrical triangular shape in the cross section view of the extruded profile for the optimal exploitation of load distribution within the welded panel, which makes the panel susceptible to bending moments and shearing within some of the final welded panel areas.

A number of other solutions have been proposed, i.e. providing the support for plasticized material in the welding zone, for example as illustrated in the above mentioned JP 2007-253210, by the equal-sized shoulders attached to the pin on the both sides (so called balanced Bobbin FSW tool) or similarly to the tool of U.S. Pat. No. 6,199,745 adjusting the distance (or the pin length) between two opposite shoulders. However, the tool of JP 2007-253210 cannot be used to weld the opposite flat portion at the tapered end of the triangular space formed between the profiles to be joined, due to lack of access space for the tool between the inclined inner walls. Thus, the joint at the opposite tapered end of the triangular space must be welded by other conventional methods. This is less preferable since different welding methods lead to different properties of the welds on the two sides of the panel. The equal-sized shoulders are applying essentially symmetrical loads for plasticizing the material in the weld area and they hold the plasticized material in the joint area in place from the both sides of both welded pieces. Symmetrical loads in turn eliminate forces acting in the normal direction to the profile plates. While this is generally desirable, the solution has an inherent limitation that the above described advantageous triangulation design of inner walls that provides the best load distribution is not achievable by hitherto available equipment, because of the limited space available for an FSW tool shoulder in the desired welding zone. A tool with symmetrical shoulders small enough to fit into such limited space between the inclined triangular inner walls would have the disadvantage of providing a limited heat input for plasticizing the material, which would result in low productivity due to low process speed (or linear movement of the tool) that would not be profitable. A sufficient size of the shoulders will require enough space between the inclined walls (as illustrated in FIG. 9 of JP 2007-253210) that in turn would prevent the favorable triangular shape design of the inner inclined walls, and would preclude intersection of the force distribution lines within the panel material.

As stated above this would subject the panel to a bending moment and would thus limit the strength of the welded final product.

Some conventional tools include means to improve the heat input and thus productivity of the process. For example the shoulders can be equipped with extensions and grooves as illustrated in JP2002-263863, which together facilitate plasticized material flow. However, in this case the contact surface configuration directs the material flow from the center part to the shoulder periphery as illustrated in FIG. 5 of JP2002-263863, and thus the material might escape which can lead to a weld joint of inferior strength and increased corrosion risk.

Several methods are available for joining double skin panels, such as soldering, gluing, conventional welding, fusion welding and friction stir welding. The joint shall desirably be quickly and cost-effectively formed, strong, fatigue and corrosion resistant, without internal defects which compromise the corrosion and mechanical integrity of the structure. The flat sides of the panel should preferably be welded by the same method in order to provide the identical properties of the seams on the both sides. This is however not achievable by JP2007-253210. Additionally, the joint shall have no or little influence on the joined objects.

Another FSW tool and method is illustrated in JP2004-216435, where the upper and lower shoulders are rotated in opposite directions due to tool design which requires very complicated equipment and results in a rather poor welding seam due to intensive mixing of the plasticized material rotated by both shoulders in the opposite directions. A tool of this type cannot be used for welding limited space configurations for the reasons described above.

Joining by FSW tool and process presents extraordinary advantages in production of panels for use in different applications, as it allows manufacturing of large, homogenous panels based on extruded profiles. The FSW tool frictionally heats the work piece material locally to a plasticized state at a temperature substantially below the melting temperature. Additionally, joining of the work pieces is made without any added filling material. Thus the joined panel structure is substantially free of heat distortion. In addition, the absence of melt-related and filler induced defects known from fusion welding results in excellent mechanical properties and tightness of the welds. Also risk of intermetallic corrosion is eliminated. The rotating tool leaves a relatively smooth weld face, flush with the work piece surface. This results in longer time to crack initiation under cyclic loading. Clearly a universal FSW tool for welding of the complicated configuration extruded profiles having a limited space for the tool access at the welding zone, and process performed at the acceptable production rates and allowing welding of such work pieces independently on their configuration are needed.

SUMMARY OF THE INVENTION

An objective of the present invention is to provide an FSW tool for efficient joining of two extruded work pieces to be welded together even having there between narrow spaces, with limited access for the tool. Another objective is to provide a method of joining work pieces by means of such an FSW tool. A further objective is to provide a new product with improved strength parameters after welding, a welded double skin panel construction comprising two or more multi-void hollow extrusions with a regular triangular cross section shape joined by the method. It is desired to obtain a tool which can be used for welding all joints also in work pieces having complicated configuration, which leads to very narrow spaces at one side of the weld zone. This is obtained according to the present invention by the provision of an asymmetrical or unbalanced FSW tool, having two shoulders of different size, and being configured for efficient joining of two extruded work pieces to be welded together even having there between a limited access for the tool in the welding zone without the use of an external support for the welding zone in order to retain the plasticized material in the welding zone.

The tool of the invention is thus a friction stir welding tool for joining two adjacent work pieces, which work pieces comprise portions to be welded and having a narrow space there between on one side, said tool having an axis of rotation (R), and comprising a first shoulder limited by its circumference periphery, a second shoulder limited by its circumference periphery, and a pin arranged so as to connect the first and second shoulders, wherein said first shoulder has a first contact surface for friction heat generation to the work pieces to be joined during welding, said first contact surface having a first contact area essentially perpendicular to the axis of rotation (R), and said second shoulder has a second contact surface for friction heat generation to an opposite surface of the same portions of the work pieces to be joined, said second contact surface having a second contact area essentially perpendicular to the axis of rotation (R), the first and second areas having different sizes, where the first area is a larger sized area, and the second area is a smaller sized area, and the smaller sized area is adapted for insertion in the narrow space between the work pieces, and thus coming into contact with one side of the work pieces, and the larger sized area coming into contact with the opposite side of the work pieces is adapted to generate friction heat from the opposite side upon rotation, which friction heat is sufficient for plasticizing the work pieces material throughout the thickness of work piece at an appropriate production speed. Preferably, at least one of the contact areas includes means to control the radial motion of the plasticized material, directing it from the shoulder circumference periphery towards the pin.

The tool is preferably adapted to move linearly along the weld line of the adjacent work pieces with a speed of at least of 10 mm/min, and may also advantageously be adapted to rotate with a speed of at least of 10 revolutions per minute.

The second area of the second contact surface of the second shoulder is smaller than the first area of the first contact surface of the first shoulder, and said second area is preferably 75% or less of said first area, preferably 50% or less. Advantageously, each of the contact surfaces of the shoulders perpendicular to the axis of rotation (R) has one of a flat, concave or convex shape in an axial cross section. The pin cross section preferably reduces in a direction from one shoulder towards the other shoulder, and may have a cross section perpendicular to the axis of rotation (R), which is one of a polygonal, circular and oval cross section. The pin and the shoulders may be made as separate elements, or the pin and one of the shoulders may be made in one piece. Alternatively, the pin and the shoulders are made in one piece.

The present invention also relates to a method of joining two adjacent work pieces by the tool described above, said work pieces having a such a configuration that on one side of the joint between the work pieces there is a more limited space or a smaller radius at the joint location (more narrow space) in which the tool shoulder is to be inserted, than on the opposite side of the joint. The method comprises the steps of:

assembling the tool having a first shoulder, a second shoulder, and a pin arranged so as to connect the first and second shoulders, starting rotation of the tool with a predetermined speed about its axis of rotation (R), aligning the tool adjacent to the two adjacent work pieces so that the first shoulder is placed in the plane of the first surface of the portions of the work pieces to be welded and the second shoulder is placed in the plane of the opposite surface of the portions of the work pieces, and linearly moving the pin of the tool along the abutment of the work pieces while having the shoulders in a contact with the corresponding surfaces of the portions of the work pieces so as to perform the welding.

An alternative method of joining two adjacent work pieces according to the invention, by means of the above mentioned tool, said work pieces having a such a configuration that on one side of the joint between the work pieces there is a more limited space or smaller radius (more narrow space) in which the tool shoulder is to be inserted, than on the opposite side of the joint, the method comprises the steps of:

drilling a hole in the abutment of the two work pieces for receipt of the pin of the tool, inserting the pin of the tool through the hole, assembling the tool having a first shoulder, a second shoulder, and a pin arranged to connect the first and second shoulders, while the first shoulder is placed in the plane of the first surface of the work pieces and the second shoulder is placed in the plane of the opposite surface of the work pieces, starting rotation of the tool with a predetermined speed, and linearly moving the pin along the abutment so as to perform the welding.

In any of the above methods the two work pieces may be multi-void hollow extrusions for forming a double-skin panels, where each hollow extrusion profile comprises a first and a second flat portions which are interconnected by confined inner walls as seen in a cross section perpendicular to the extrusion direction, further comprising the steps of placing two extruded profiles adjacent to each other, such that the extrusion directions of each profile are parallel to each other, and such that an intersection of one flat portion and the inner walls of one profile are facing a corresponding intersection of one flat portion and the inner walls of the other profile, such that a narrowing space is formed between the inner confined walls of the profiles;

joining at least the two first flat portions of the two profiles by moving the tool longitudinally along the extrusion direction through the narrowing space forming a double-skin panel. The work pieces may be multi-void hollow extrusions comprising inner walls connecting the flat portions, which inner walls are arranged in a triangular configuration, where each hollow extrusion includes a first and a second flat portion, parallel to each other, a central inner wall perpendicular to said flat portions, and inclined inner walls on each side of the central inner wall, whereby an equally sided triangle is formed by the two inclined inner walls and one of the flat surfaces. The welding of the first two flat portions and the second two flat portions is preferably performed simultaneously. The tool may apply a finite vertical force to the work pieces, wherein the vertical force is at least 100 N.

The invention also relates to a product obtained by the method or methods described above, comprising at least two portions welded together so as to form a joint having a weld face, where the weld faces have different widths on opposite surfaces of the welded product. The product may be a double skin panel construction comprising two or more extruded profiles joined by the above method, each extruded profile having two opposite flat portions interconnected by the inner walls, wherein the weld face width on one surface of the flat portion of the double skin panel is wider than the weld face width on the opposite surface of the same flat portion of the panel. The double skin panel with improved strength made from the plurality of the extruded profiles has preferably a regular triangular cross section in the direction perpendicular to the extrusion direction for preventing the bending loads manufactured so that the imaginary load distribution lines are intersected within the panel material.

The present invention also relates to the use of the above described tool for friction stir welding of two adjacent work pieces. The work pieces are preferably metal double skin deck panels with inclined inner walls of the regular triangular cross section perpendicular to the longitude direction, or the welded work pieces may have curved welded edges of a smaller radius on one side.

As indicated above, the tool preferably keeps the plasticized material in the weld zone by controlling the material motion from the circumference periphery towards the pin. This can be obtained by different means which are per se known in the art, for example by arranging a particular pattern on the contact surfaces. Such pattern is preferably radial or partly radial and can also consist of grooves, extensions, scrolls etc.

The tool can be advantageously used, for example for welding of multi-void hollow extrusions having a regular triangular cross section shape between the inclined intersectional walls providing the product as double skin panels of the regular triangular cross section, tube-shaped products, bended panels, etc at the economically profitable production speed due to a larger heat input achieved by one enlarged size shoulder. Alternatively, other curved surfaces of different cross sectional shapes which are to be joined can also be manufactured. The new panel according to the invention has essentially the same specific strength-to-weight ratio as the individual extruded profiles from which it is manufactured and could be welded by the FSW method from both sides providing the identical properties of the weld seams. The present invention provides an FSW tool with asymmetrical shoulders wherein one shoulder is larger than the other one. This geometrical asymmetry allows increasing heat input to the welded area on at least one side and thus increases the production rates to reasonable profitable values. At the same time, the shoulder contact surfaces are preferably configured in a way leading the plasticized material from the shoulder circumference periphery to its center, or to the pin so that the material is retained in the welded area between the shoulders and thus preventing material from escaping due to process loads and/or gravidity from the weld seam until it cools down. This effect can be achieved by different suitable contact surface configuration, geometry, patterns and shapes.

The larger size shoulder allows for a large the in diameter adjacent to said shoulder, which in combination with increased heat input significantly prolongs the working life of the tool.

The tool of the invention allows for simultaneous or in turn welding from any side and/or both sides of the double skin panels or tubes made of extruded aluminum profiles or other elements of different or sophisticated configurations. The tool is particularly useful when joining work pieces with limited access for the tool to the welding zone between the work pieces, such as between two inclined inner walls of a regular triangular cross section multi-void hollow extrusions with a narrow space between the members of construction, or when joining curved work pieces having a small radius at the location of the FSW joint or the welding zone. In such cases there is not sufficient space for conventional tool shoulder access, and thus an external support element would be required for the welding zone. The tool according to the invention eliminates the need of such external support element due to small size of the shoulder fitting into the narrow space between the work pieces to be joined, and the heat input generated in enhanced by the larger size of the second tool shoulder, so as to sufficiently plasticize the material in the weld area, thereby increasing the production rates and profitability. The process may preferably also be improved by geometry of the shoulders contact surfaces controlling the motion of the plasticized material from the shoulders periphery towards the pin, thus further improving the weld quality.

The work pieces can for example be joined abutting or overlapping. It is to be noted that welding together two overlapping work pieces by the present invention has the advantage that the risk of corrosion is substantially avoided, since the weld seam will reach throughout the material thickness, leaving no gaps where moisture can be collected. Joining of abutting work pieces lead to weld joints where no moisture is collected, giving reduced risk for corrosion and also provides better load distribution through the final product. The friction stir welding tool of the invention has an axis of rotation, and comprises a first shoulder limited by its circumference periphery, a second shoulder limited by its circumference periphery, and the pin arranged so as to connect the first and second shoulders. The first shoulder has a first contact surface for a friction heat generation on both work pieces to be joined during welding, said first contact surface having a first area ($a_1$) essentially perpendicular to the axis of rotation, and the second shoulder has a second contact surface for friction heat generation onto an opposite surface of the two work pieces to be joined. Said second contact surface has a second area ($a_2$) essentially perpendicular to the axis of the pin rotation. The first contact surface and the second contact surface have different sizes. Thereby, the areas ($a_1$) and ($a_2$) together with a pin (3) contribute the friction heat sufficient for plasticizing of the work piece material throughout the welding zone, and that at least one of the first contact surface (A1) and the second contact surface (A2) is arranged to control the motion of the plasticized material from the shoulder (1, 2) periphery towards the pin (3). As discussed above, at least one of the contact surfaces is formed such that its axial cross sectional shape and/or a pattern on its surface directs the plasticized material radially from the shoulder circumference periphery towards the center or towards the pin, thus retaining the material in the welding zone. The pattern may for example include extensions or grooves arranged straight radially from the shoulder circumference periphery or in the form of arcs, one end of which situated adjacent to the shoulder circumference periphery and the other end adjacent to the pin. Other patterns and shapes can also be contemplated to achieve the motion of plasticized material towards the pin.

The smaller contact area shoulder allows joining of two adjacent work pieces with a limited space there between, as the tool can be inserted into the limited space due to its small dimension and allows FSW welding without use of an external support, and at a profitable process speed due to sufficient friction heat generation provided by the second large contact area tool shoulder. The suitable ratio between the dimensions of the contact surfaces A1 and A2, or areas $a_1$ and $a_2$ will vary depending on the thickness of the welded work pieces, their material and their geometry, but should be chosen so as to guarantee sufficient friction heat generation to enable plasticizing of the material throughout the weld zone, retention of the plasticized material in the welded seam zone and the appropriate welding speed (i.e. the linear speed of the tool/the pin movement along the welded line between the work piece edges). Depending on the shape of the work pieces, the contact area $a_2$ of the smaller shoulder can preferably be 75% or less of the contact area $a_1$ of the larger shoulder. In certain cases the contact area $a_2$ can be 50% or less of the contact area $a_1$, and when the space available for the smaller shoulder is extremely small, the contact area $a_2$ can be 20% or less of the contact area $a_1$ Retention of the plasticized material in the weld zone can also be facilitated by a special profile of and/or a radial or partly radially directed pattern on the contact surfaces A1, A2 of the tool, as discussed above. Such arrangement controls the plasticized material motion from the circumference periphery of the shoulder towards the pin and thus providing retention of it in place until it cools down.

The invention further relates to a method of joining two adjacent work pieces by said FSW tool. The method comprises the following steps: assembling the tool having a first shoulder, a second shoulder, and a pin connecting the first and second shoulders; rotating the tool with a predetermined speed; aligning the tool adjacent to the two abutting work pieces so that the first tool shoulder is placed in the plane of the first surface of the both work pieces and the second tool shoulder is placed in the plane of the opposite surface of the both work pieces; and linearly moving the pin along the abutment of the two work pieces while having the shoulders in a contact with the corresponding opposite surfaces of the both work pieces no as to perform the welding by heating the material of the work pieces to the plasticized condition in the joint area due to the friction between the shoulders and the work pieces surfaces. A further step may comprise an entry notch at the abutment of the work pieces so as to ensure the correct position of the rotating pin at the beginning of the welding process.

The method may alternatively comprise the steps of: drilling a hole in the abutment of the two work pieces for receipt of the pin of the tool; inserting the pin (3) of the tool through the hole; assembling the tool having a first shoulder, a second shoulder, and a pin arranged to connect the first and second shoulders, while the first shoulder is placed in the plane of the first surface of the work pieces and the second shoulder is placed in the plane of the opposite surface of the work pieces; starting rotation of the tool with a predetermined speed; and linearly moving the pin along the abutment so as to perform the welding.

The invention also relates to a product such as a panel, particularly a so called double skin panel made of the extruded profiles by the method. In addition, the present invention relates to the use of said friction stir welding tool for joining two abutting work pieces. The invention is applicable to the friction stir welding of different materials such as metals and plastics.

Another aspect of the invention is the use of the friction stir welding tool as described above for friction stir welding of two abutting work pieces, where the work pieces are two metal bended or flat panels, preferably are metal double skin panels or one bended sheet having two opposite edges to be welded together.

BRIEF DESCRIPTION OF DRAWINGS

Further features and advantages of the invention will now be described with reference to the enclosed schematic figures, where

FIG. 3a is a schematic view of a friction stir welding tool of the invention;

FIG. 3b is an exploded view of the friction stir welding tool of FIG. 3;

FIG. 4 is a schematic view of another embodiment of a friction stir welding tool of the invention which allows axial adjustment of the shoulders positions relative to each other for different thickness of the work pieces and for a control of the applied forces;

FIG. 5 illustrates a three-dimensional view of one possible embodiment of a friction stir welding tool of the invention;

DETAILED DESCRIPTION OF THE INVENTION

Figure 1:
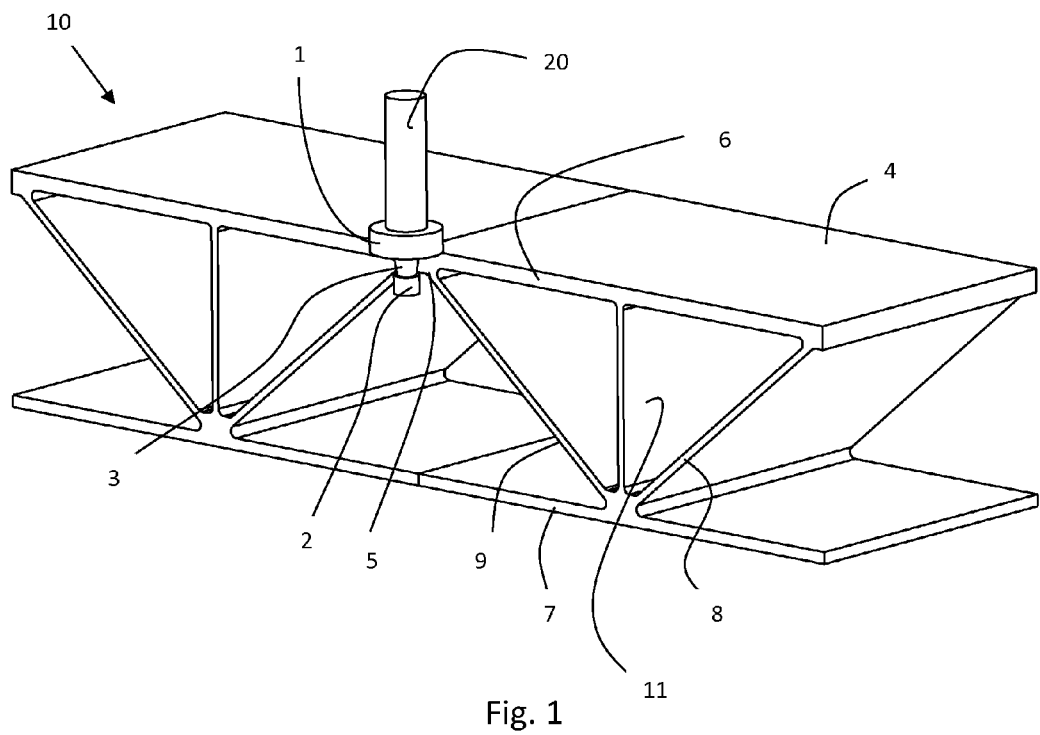
FIG. 1 is a perspective view of an asymmetrical or non-balanced friction stir welding tool according to the invention with one enlarged shoulder, and multi-void hollow extrusions to be joined illustrating one method of friction stir welding.

The invention will now be described in details by referring to the appended drawings. Corresponding elements of the different embodiments have the same reference numerals. It is to be understood that the scope of the invention is not limited to the embodiments as shown in the appended Figures which are used only for clarification purpose.

Figure 2:
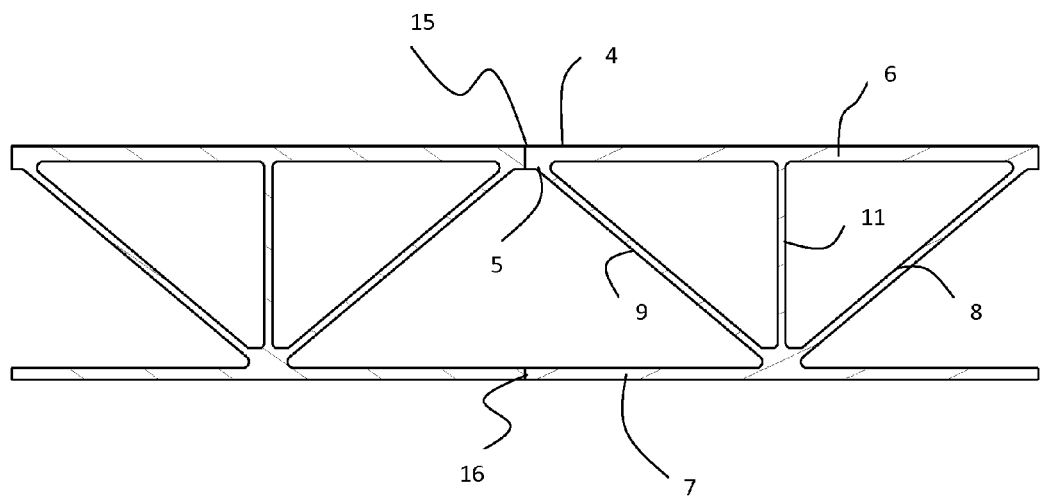
FIG. 2 is a cross-sectional view of two multi-void hollow extrusions which upon welding form a product in form of a double skin panel according to the invention.

The reference numerals in the drawing indicate:
1 first shoulder
2 second shoulder
3 pin
4 first surfaces of first portions 6 of the work pieces
5 opposite surfaces of first portions 6
6 first portions of the work pieces
7 second portions of the work pieces
8 inclined inner wall
9 inclined inner wall
10 work piece
11 central inner wall
15 joint between flat portions 6
16 joint between flat portions 7
17 narrowing portion in joint 15
20 FSW tool FIG. 1 shows a cross-sectional view of a two adjacent and abutting hollow extrusion profiles 10, which are being joined by a friction stir welding tool 20 according to a method of the invention. FIG. 2 shows a product in form of a double skin panel, which has been obtained by welding with friction stir welding tool 20 of two or more multi-void extruded profiles. It is to be noted that even though the invention is illustrated by means of multi-void extrusions, having flat upper and lower skins, the FSW tool of the invention can as well be used to join profiles, panels or other details of any design, having flat or curved shape. In this description the invention is described in relation to joining two work pieces of identical shape. However, it should be noted that work pieces of different shape can be joined equally well. For the sake of simplicity the same reference numerals have been used for both details to be joined, when illustrated in the appended drawings. The tool 20 is schematically illustrated in FIGS. 3a and 3b. It is to be noted that the tool illustrated in FIGS. 3a and 3b are merely examples of an FSW tool of the invention, and that various other designs of the tool's parts with different conventionally known surface features may be conceivable.

The friction stir welding tool 20 of the present invention comprises a pin 3 rotated about its axis (R) which is also a rotation axis (R) of the tool and a first and a second radial extensions at both ends of the pin, so called shoulders 1, 2. The first shoulder 1 has a first contact surface A1, which is to be in contact with one surface 4 of the work pieces 10 formed in this embodiments by the extruded profiles 10 to be joined during welding, and the first contact surface A1 has a first area $a_1$, which is essentially perpendicular to the axis of rotation R. The second shoulder 2 has a second contact surface A2, which is to be in contact with opposite surfaces 5 of the two work pieces to be joined, said second contact surface A2 having a second area $a_2$ essentially perpendicular to the axis of rotation R. These contact surfaces A1 and A2 have different contact areas $a_1$ and $a_2$. In the embodiment shown in FIG. 1 and FIG. 3a-3b, the second contact surface area $a_2$ is smaller than the first contact surface area $a_1$. Accordingly, the radial dimension r2 is smaller than the radial dimension r1. It is to be understood that the tool 20 can be turned upside down during operation, and the contact surface area $a_1$ maybe smaller then the contact surface area $a_2$.

Each of said first and second shoulders 1, 2 has a function to heat the material in the joint area due to friction between the each shoulder contact surface and the both work pieces opposing surfaces and at the same time to hold a plasticized material in the area of the joint. The contact surface A1, A2 of each shoulder is essentially perpendicular to the axis of rotation (R) of the tool and adapted to be in tight contact with two adjacent surfaces 4, of two flat portions of the two work pieces 10 as multi-void hollow extrusions and the opposing surfaces 5 of the same flat portions to be joined during welding. These contact surfaces have different contact areas, i.e. one is smaller than the other, but the contact surfaces are still sufficient in size for holding the plasticized material in the place of welding zone; such design with different contact areas allows use of the tool also within a limited space in the area of the joint between the two work pieces to be joined like between the two inclined and intersected inner walls in the mentioned above double skin panels of the multi-void hollow extrusions or joint of a bended panel to a tube shape detail. The surfaces of the shoulders can be machined in a particular way to provide a special pattern, preferably in a radial or partly radial direction for controlling the plasticized material motion toward the pin. Alternatively, other forms and shapes of the contact surfaces (e.g. concave, convex/concave etc.), which are per se known in the art could facilitate the material motion.

As the contact areas $a_1$ and $a_2$ are of the different sizes, the loads applied by the tool to the opposite sides of the jointed portion of the welded work pieces are also different. The loads are preferably balanced through the extrusions and by the application of an external support in accordance with a definite algorithm. In particular, the second area $a_2$ of the second contact surface of the second shoulder may be smaller than the first area $a_1$ of the first contact surface of the first shoulder, said second area $a_2$ being 75% or less of said first area $a_1$. Preferably, the relation of the first $a_1$ and second $a_2$ contact areas is obtained by providing a second shoulder 2 having a smaller diameter than the first shoulder 1. Since the second area $a_2$ is substantially smaller that the first area $a_1$, it is made possible to join two abutting work pieces where there is very limited space on one side (surfaces 5) of the work pieces 10. For example this is the case when joining the multi-void extrusions into double skin panels, where the perfect triangulation of the inner walls 8, 9, 11 or trusses is desired for the improved load distribution, allowing the load vectors intersect within the double skin panel body for the better strength of the construction. A radial dimension, which is the distance from the pin outer surface to an outer edge of the second contact surface of the second shoulder, may be at least 1.5 mm, preferably 2-50 mm, more preferably 10-30 mm, most preferably 15-25 mm. These dimensions are advantageous for a weld thickness of 15 mm to 20 mm. The length of the pin 3 can vary in a wide range and depend on the thickness of the work pieces 10, 10' to be welded. The pin 3 is illustrated in FIGS. 3a and 3b with a conical shape in direction of the rotation, but may instead have a cylindrical or have another shape in direction of the rotation and the pin's surface might be a smooth or machined provided with cuts, grooves, threads and other known in the art advantageous patterns.

The tool illustrated in FIGS. 3a and 3b has a rectangular, circular or polygonal cross section perpendicular to the axis R of the tool rotation. However, each of the contact surfaces A1, A2 of the shoulders 1, 2 may have a flat, tapered, concave or a convex shape in a cross section perpendicular to the axis R of the tool rotation. Convex shoulders can give improved results when welding work pieces with poor tolerances. The shoulders' contact surfaces may be smooth or featureless or may be machined and comprise features like scrolls, ridges, threads, grooves or scopes. Such features improve work piece 10 material deformation, heat input and material mixing. Scrolls facilitate material capture and general improves material flow around the tool and material mixing. The shoulder shape in a cross section perpendicular to the axis R of the tool rotation as well as any contact surface of the shoulders can be combined with any shape of the pin, as described above. The distance between the first contact surface and the second contact surface is adapted to the thickness of the work pieces to be welded (e.i. as illustrated in FIG. 4), and is preferably at least 3 mm or more.

The pin 3 cross section may reduce in a direction from one shoulder towards the other shoulder. In other words, the pin may taper in a direction from one shoulder towards the other. Thereby, forces and torques needed for welding may be decreased. The pin 3 may further have a cross section perpendicular to the axis of rotation, which is one of a polygonal, circular and oval cross section. The tool shown in FIG. 3b has the pin 3 and the shoulders 1, 2 made all as separate elements, which are assembled to form the tool 20, i.e. the pin 3 is releasable attached to the first and second shoulder. However, alternatively, the pin 3 and one of the shoulders may be made in one piece. Then the position on the pin 3 with the second shoulder can be adjusted relative to the first shoulder such that the pin 3 length will be equal to the thickness of the material to be welded. Alternatively, the pin 3 fixed to the first shoulder can be threaded through the second shoulder which then will be fixed to the pin 3, see FIG. 4. Furthermore, at least one of the shoulders 1, 2 can be made as a separate component that is non-releasable attached to the pin by the means of welding or in the other suitable way, or as a further alternative, the pin 3 and the both shoulders 1, 2 are made in one piece. These alternative ways of assembling the tool can be applied on any of the above described tool designs.

A multi-void hollow extrusion or work piece 10 as illustrated in FIGS. 1-2 comprises a first flat portion 6 and a second opposite flat portion 7, and the inner walls 8, 9, 11 interconnecting the flat portions 6, 7, which the inner walls 8, 9, 11 arranged in a triangular configuration seen in the cross section to the extrusion direction. The central inner wall 11 is perpendicular to the flat portions 6, 7, and the inclined inner walls 8, 9 are arranged on each side of the central inner wall 11, to form an equally sided triangle with one of the flat surfaces 6, 7. As indicated above, any other profile design can be joined by the tool of the invention.

A method for joining two abutting work pieces 10 by the above described tool 20 according to the invention may comprise the following steps. The tool is first assembled from the pin 3 and the shoulders 1, 2. The work pieces are placed with the surfaces to be joined in abutting relationship. Then rotation of the tool 20 is started with a predetermined rotation speed. The tool 20 is aligned adjacent to the two abutting work pieces 10 so that the first shoulder 1 is placed in the plane of the first surfaces 4 of the work pieces 10 and the second shoulder 2 is placed in the plane of the opposite surfaces 5 of the work pieces 10, and the tool is than linearly moved along the abutment of the work pieces 10, while having the tool shoulders 1, 2 in tight contact with the corresponding surfaces 4, 4' and 5 of the both work pieces 10 for forming a weld joint 15. A further step of the method of friction stir welding by this tool 20 may comprise making an entry notch at the edge of the abutment of the two work pieces 10 so as to ease the entry of the rotating tool at the beginning of the welding process.

If a welding tool 20 with at least one releasable shoulder 1 or 2 is used, the method may alternatively comprise the steps of: drilling a hole in the abutment of the two work pieces 10, 10' for receipt of the pin 3 of the tool 20, inserting the pin 3 of the tool through the hole, adjusting the length of the pin 3 to be equal to the flat portions 4 material thickness by moving the releasable shoulder relative the other one, and assembling the tool 20 comprising the first shoulder 1, and the second shoulder 2 by fixing the releasable shoulder to the pin 3, while the first shoulder 1 is placed in the plane of the first surfaces 4 of the flat portions 6 of the two work pieces 10 and the second shoulder 2 is to be placed in the plane of the opposite surfaces 5 of the same flat portions 6 of the work pieces 10. Then starting rotation of the tool 20 at a predetermined speed, and moving the tool 20 linearly along the adjacent edges of the work pieces 10 so as to perform welding and forming a joint 15.

Similarly or simultaneously the other opposite flat portions 7 of the same work pieces (extruded profiles) 10 may be welded forming a welded joint 16, and thus a double skin panel of the extruded profiles is obtained.

The tool 20 is advantageously rotated at 100-3000 revolutions/min, and moves linearly along the abutting edges of the two work pieces at a speed of 50-2000 mm/min. The tool 20 typically applies a finite vertical force to the welded work pieces for balancing the forces applied by the different contact areas $a_1$ and $a_2$ of the tool to the work pieces 10, and the vertical force is typically at least 100 N. The tool 20 is preferably manufactured from a material with very good strength, fracture toughness, dimensional stability and wear resistance within the full range of process temperatures. The tool material needs to be reasonably machineable and show good corrosion resistance and chemical stability including stability against elements present in the work piece material within the temperature range involved.

The method of the present invention is particularly useful for joining work pieces or multi-void hollow extrusions made of metal, more particularly of aluminum and its alloys. The tool and the method of the invention can be applicable for the other materials such as plastics and compounds.

As shown in FIGS. 1 and 2, the two adjacent work pieces 10, 10' may be multi-void hollow extrusions, e.g. for forming double skin panels, where each of extruded profile comprises a first and a second flat portion which are interconnected by confined inner walls as seen in a cross section perpendicular to the extrusion direction. The method of manufacturing such panels include the steps of placing two extruded profiles or multi-void extrusions adjacent to each other, such that the extrusion directions of each profile or extrusions are parallel to each other, and such that an intersection of one flat portion and the inclined inner walls of one profile 10 are facing a corresponding intersection of one flat portion 6 and the inclined inner walls of the other profile 10, such that a narrowing space is formed between the inner inclined confined walls of the profiles or extrusions 10; and joining at least the two flat portions 6, 6' of the two profiles 10 by moving the tool 20 longitudinally along the extrusion direction through the narrowing space, thus forming a double-skin panel (wherein the skin means the outer flat portion 6). Advantageously, both skins 6 of the hollow extruded profiles are connected by the tool 20, by moving the tool's pin 3 longitudinally along the extrusion direction. The welding of the first two flat portions (skins) 6 and the second two flat portions (skins) 7 is preferably performed simultaneously by two identical tools 20 according to the invention. Alternatively, the flat portions or skins 6 and 7 could be welded one after the other by the same tool 20.

Figure 9:
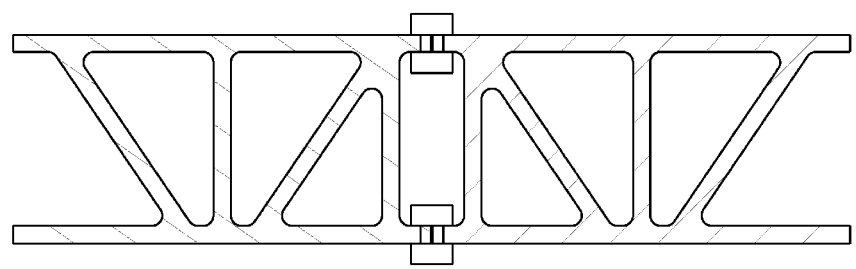
FIGS. 9,10 illustrate the prior art balanced symmetrical friction stir welding tool and methods of joining two abutting work pieces by the conventional friction stir welding tool.
Figure 10:
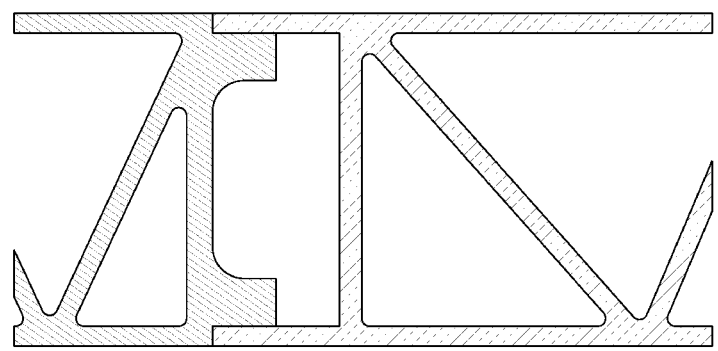

In particular, the multi-void hollow extrusions may have inner walls 8, 9 connecting the flat portions 6 7, which inner walls 8, 9 in cross-section to the extrusion direction are arranged in a triangular configuration. Thus, each extrusion 10 can include first and second flat portions 6, 7, which are parallel to each other, a central inner wall 11 perpendicular to said flat portions, and inclined inner walls 8, 9 on each side of the central inner wall 11, whereby an equally sided triangle is formed by the two inclined inner walls 8, 9 and one of the flat portions 6 or 7. Such extrusions can be joined according to the present invention to a panel made of multi-void hollow extrusion or a "double-skin panel". Alternatively, the perpendicular central wall 11 may be eliminated and the double skin profile 10 might comprise only inclined inner walls 8, 9. Such panels can be used for example in construction of bridges or ship-deck constructions. In order to obtain high strength in such double skin panels, it is often desirable to provide a configuration where the inclined inner wall 8 of one profile 10 form an equally sided triangle also with the inclined inner wall 9 of an adjacent hollow extrusion profile 10'. This has not been possible to achieve with previously available conventional friction stir welding tools. Instead, it has been necessary to include various supporting members as vertical inner walls into the hollow extrusion profile, as illustrated in FIGS. 9 and 10, or alternatively to use removable supporting members under the welding joint 15 which generally impair weld quality and productivity.

The invention also relates to a new product obtained by the method as described above as the tool 20 of the invention allows manufacturing of panels from extruded work pieces of simplified shape and lighter weight, thereby decreasing the amount of required metal at the same strength demand.

Figure 11:
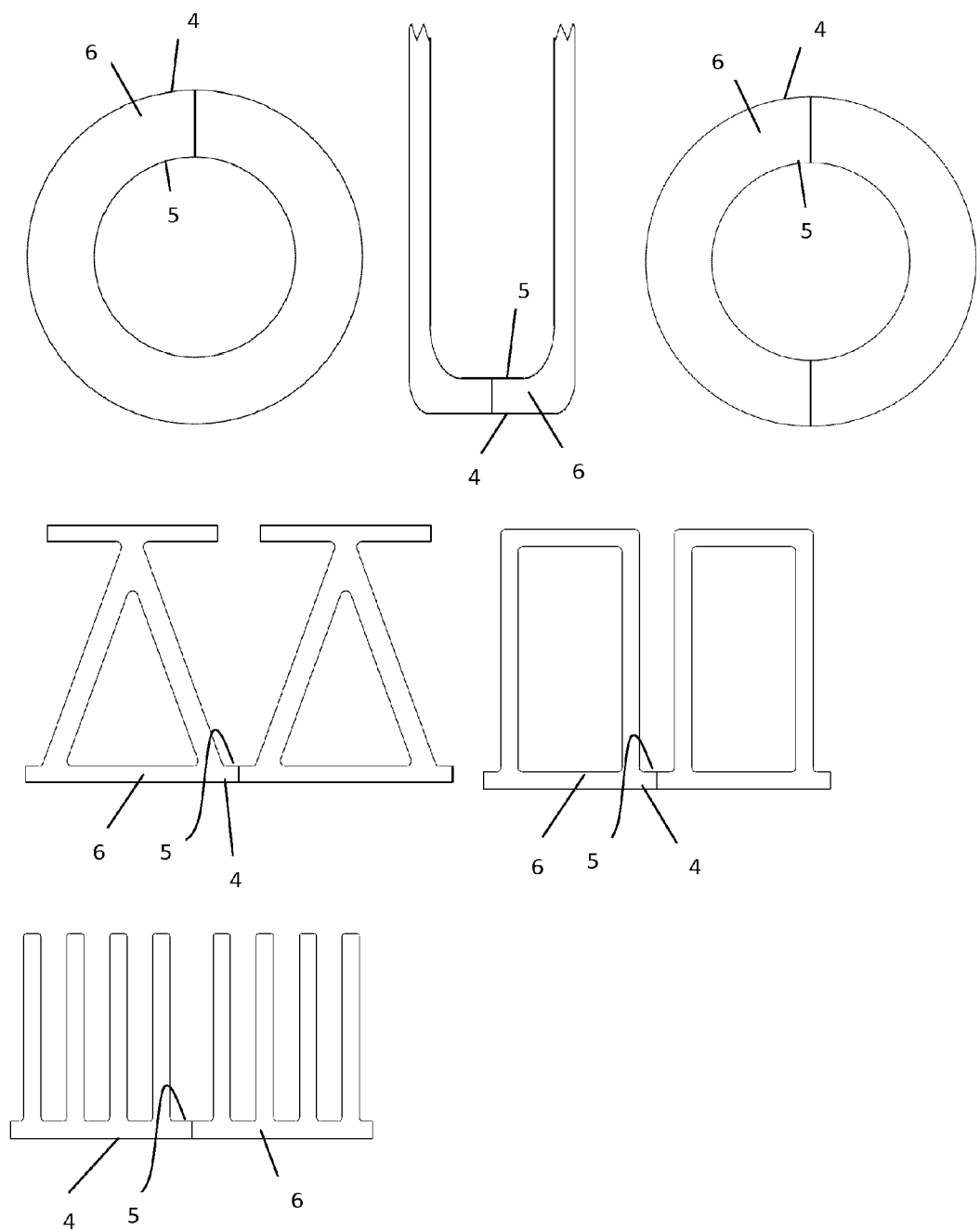
FIG. 11 illustrates the different kinds of products having a limited access for the tool shoulder on at least one side enabling manufacturing by use of the FSW tool according to the invention

Alternatively the other products examples of which are illustrated in FIG. 11 such as tube-shaped details manufactured from the bended plates or sheets, or the other products such as air or water coolers might be manufactured by these methods. As indicated above, the product is preferably a double-skin panel construction comprising two or more multi-void hollow extrusions joined by the above method. Each extruded profile includes two flat portions and interconnecting inner walls, wherein the weld face width on one surface of the one flat portion of the panel is wider than the weld face width on the opposite surface of the same flat portion of the profile. The product may be the panel made of a plurality of multi-void hollow extrusions, e.g. for use as the deck panel member in ship or bridge constructions, comprising two or more hollow extrusion profiles joined longitudinally with the method described above.

Figure 6:
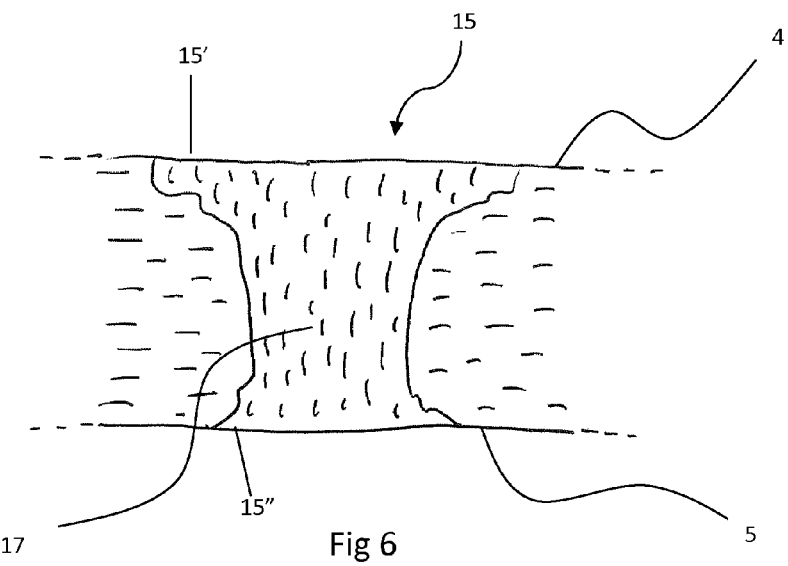
FIG. 6 is a schematic view of a cross section of a weld joint obtained by the friction stir welding tool of the invention.

The rotating shoulders 1, 2 of the tool 20 leave marks on the surfaces 4 and 5 of the profile portions joined by the tool, which marks are referred to as weld faces 15', 15" of the joint 15. The product comprises at least two portions 6, welded together so as to form a joint 15 having a weld face, where the weld face has different widths on opposite surfaces of the welded product seen in cross section. Since the second contact area $a_2$ of the tool as described above is smaller than the first contact area $a_1$, the weld face widths will have different sizes. The joint 15 between the two portions of the panels thus obtained has a specific appearance as illustrated in FIG. 6, due to the design of the tool 20, and is wider in the region of the larger shoulder contact area $a_1$ than in the region of the opposing smaller shoulder contact area $a_2$, and has a narrowing portion in between. The joint 15 between the panels is wider towards surface 4 in the region of the larger shoulder contact area than towards surface 5 in the region of the opposing smaller shoulder contact area, and has a narrowing portion 17 in between.

FIG. 5 shows an alternative design of a friction stir welding tool of the invention, where the pin has one set of flutes up, one set of flutes down and one neutral set. Alternatively, grooves or other machined patterns can be provided on the tool's shoulders and/or the pin.

Figure 7:
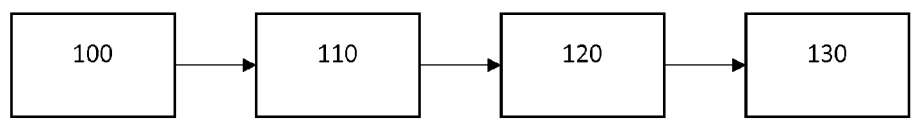
FIGS. 7-8 illustrate flow schemes for the method of joining two abutting work pieces

FIG. 7 illustrates a flow scheme for the method of joining two abutting work pieces, including the steps of: assembling 100 the tool; starting rotation 110 of the tool; aligning 120 the tool adjacent to the two abutting work pieces, possibly adjusting the distance between the shoulders; and linearly moving 130 the tool along the abutment of the work pieces. A further step may comprise an entry notch at the abutment of the work pieces so as to ensure the correct position of the rotating pin at the beginning of the welding process.

Figure 8:
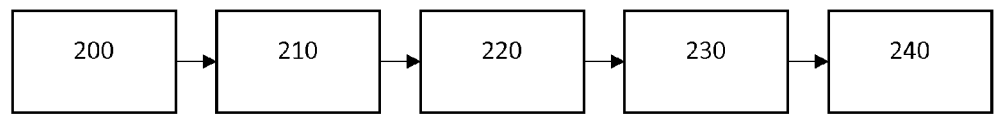

FIG. 8 illustrates a flow scheme for the method of joining two abutting work pieces, including the steps of: drilling 200 a hole in the abutment of the two work pieces, for receipt 210 of the pin of the tool; inserting the pin of the tool through the hole, assembling 220 the tool (first and second shoulder 1, 2 and connecting pin 3) while adjusting the distance between the first and second shoulders, starting rotation 230 of the tool, and linearly moving 240 the pin along the abutment so as to perform the welding.

FIGS. 9 and 10 illustrate prior art methods of joining two abutting work pieces as mentioned above. As can be seen additional perpendicular inner walls are used adjacent the joint (FIG. 9) and space in between them is widened in order to accommodate for the conventional balanced symmetrical FSW tool or a supporting structure as an extension is incorporated in one of the work pieces (FIG. 10).

FIG. 11 shows examples of the alternative profile designs that can be joined by means of the tool of the present invention. Such profiles are e.g. multi-void extrusion, tube-shaped details, different profiles having a limited access for the tool at one side, hollow elements and different products such as panels, constructions, coolers etc used in a various technical fields and for various applications.

It is to be noted that the invention should not be limited by the above described embodiments, but should encompass any alternative that would fall within the scope of the claims.

The invention claimed is:

1. A non-balanced friction stir welding tool for joining two adjacent work pieces, which work pieces comprise portions to be welded, said tool having an axis of rotation, and comprising
    a first shoulder limited by its circumference periphery,
    a second shoulder limited by its circumference periphery, and
    a pin adapted to connect the first and second shoulders, wherein
    said first shoulder has a first contact surface for friction heat generation to the work pieces to be joined during welding, said first contact surface having a first contact area substantially perpendicular to the axis of rotation, and
    said second shoulder has a second contact surface for friction heat generation to an opposite surface of the same portions of the work pieces to be joined, said second contact surface having a second contact area substantially perpendicular to the axis of rotation, the first and second areas having different sizes, where the first area is a larger sized area, and the second area is a smaller sized area,
    further wherein the smaller sized contact area is adapted for insertion in a narrow space between the work pieces the portions forming the narrow space on one side and defining a surface by either the inclined walls or by curved wedge edges of a smaller radius and thus coming into contact with one side of the work pieces, and the larger sized area of the first shoulder coming into contact with the opposite side of the work pieces is adapted to generate friction heat from the opposite side upon rotation, which friction heat is sufficient for plasticizing the work pieces material throughout the thickness of work piece at an appropriate production speed.

2. The tool according to claim 1, wherein at least one of the first and second contact areas is adapted to control the radial motion of the plasticized material, directing the plasticized material from the shoulder circumference periphery towards the pin.

3. The tool of claim 1, wherein the tool is adapted to move linearly along the weld line of the adjacent work pieces with a speed of at least of 10 mm/min.

4. The tool of claim 1, wherein the tool is adapted to rotate with a speed of at least of 10 revolutions per minute.

5. The tool of claim 1, wherein the second area of the second contact surface of the second shoulder is smaller than the first area of the first contact surface of the first shoulder, said second area being 75% or less of said first area.

6. The tool of claim 1, wherein each of the contact surfaces of the shoulders perpendicular to the axis of rotation has at least one of a flat, concave or convex shape in an axial cross section.

7. The tool of claim 1, wherein the pin cross section reduces in direction from one shoulder towards the other shoulder.

8. The tool of claim 1, wherein the pin has a cross section perpendicular to the axis of rotation, which is one of a polygonal, circular and oval cross section.

9. The tool of claim 1, wherein the pin and the shoulders are made as separate elements.

10. The tool of claim 1, wherein the pin and one of the shoulders are made in one piece.

11. The tool of claim 1, wherein the pin and the shoulders are made in one piece.

12. The tool of claim 1, wherein a radial dimension defined as the distance from the pin outer surface to an outer edge of the second contact surface of the second shoulder, is at least 1.5 mm for a weld thickness of 15 mm to 20 mm.

13. A method of joining two adjacent work pieces by the tool of claim 1, said work pieces being adapted such that on one side of the joint between the work pieces portions there is a more limited space than on the opposite side of the joint, the limited space defining a surface and formed by either the inclined walls or by curved wedge edges of a smaller radius in which the limited space the tool shoulder is to be inserted, the method comprising steps of:

assembling the tool having a first shoulder, a second shoulder, and a pin arranged so as to connect the first and second shoulders, starting rotation of the tool with a predetermined speed about its axis of rotation, aligning the tool adjacent to the two abutting work pieces portions having either the inclined walls or curved wedge edges of a smaller radius so that the first shoulder is placed in the plane of the first surface of the portions of the work pieces to be welded and the second shoulder is placed in the plane of the opposite surface of the portions of the work pieces, and linearly moving the pin of the tool along the abutment of the work pieces while having the shoulders in contact with the corresponding surfaces of the portions of the work pieces so as to perform the welding joint.

14. A method of joining two adjacent work pieces by the tool of claim 1, said work pieces having portions adapted such that on one side of the joint defining a surface between the work pieces there is a more limited space in which the one tool shoulder is to be inserted, than on the opposite side surface of the joint, the method comprising:

drilling a hole in the abutment of the two work pieces portions for receipt of the pin of the tool, inserting the pin of the tool through the hole, assembling the tool having a first shoulder, a second shoulder, and a pin arranged to connect the first and second shoulders, while the first shoulder is placed in the plane of the first surface of the work pieces and the second shoulder is placed in the plane of the opposite surface of the work pieces, starting rotation of the tool with a predetermined speed, and linearly moving the pin along the abutment of the portions so as to perform the welding joint.

15. The method according to claim 13, wherein the two abutting work pieces are multi-void hollow extrusions for forming double-skin panels, where each hollow extrusion profile comprises first and second flat portions which are interconnected by confined inner walls as seen in a cross section perpendicular to the extrusion direction, further comprising the steps of:

placing two extruded profiles adjacent to each other, such that the extrusion directions of each profile are parallel to each other, and such that an intersection of one flat portion and the inner walls of one profile are facing a corresponding intersection of one flat portion and the inner walls of the other profile, such that a narrowing space is formed between the inner confined walls of the profiles;

joining at least the two first flat portions of the two profiles by moving the tool of claim 1, longitudinally along the extrusion direction through the narrowing space forming a double-skin panel.

16. The method of claim 15, wherein the work pieces are multi-void hollow extrusions comprising inner walls connecting the flat portions, which inner walls are arranged in a triangular configuration, where each hollow extrusion includes a first and a second flat portion, parallel to each other, a central inner wall perpendicular to said flat portions, and inclined inner walls on each side of the central inner wall, whereby an equally sided triangle is formed by the two inclined inner walls and one of the flat surfaces.

17. The method of claim 16, wherein the welding of the first two flat portions and the second two flat portions is performed simultaneously forming the joints.

18. The method of claim 13, wherein the tool applies a finite vertical force to the work pieces, wherein the vertical force is at least 100 N.

19. A product obtained by the method of claim 13, comprising at least two portions welded together so as to form a joint having a weld face with the different widths on opposite surfaces of the welded product, wherein the product has on one side a narrow space formed either by the inclined walls or curved wedge edges of a smaller radius between the work pieces to be welded together.

20. The product of claim 19, wherein the product is a double skin panel construction comprising two or more extruded profiles joined by the method of claim 13, each extruded profile having two opposite flat portions interconnected by the inner walls, wherein the weld face width on one surface of the flat portion of the double skin panel is wider than the weld face width on the opposite surface of the same flat portion of the panel.

21. The product of claim 20, wherein the double skin panel with improved strength made from the plurality of the extruded profiles has a regular triangular cross section in the direction perpendicular to the extrusion direction, the panel manufactured so that the imaginary load distribution lines are intersected within the panel material preventing the bending loads.

22. Use of the tool according to claim 1, for friction stir welding of two adjacent work pieces with portions having either the inclined walls or curved wedge edges of a smaller radius on one side.

23. Use of the tool according to claim 1, wherein the work pieces are metal double skin deck panels with inclined inner walls of the regular triangular cross section perpendicular to the longitude direction.

24. Use of the tool according to claim 1, wherein the welded work pieces have curved welded edges of a smaller radius on one side.

* * * * *